Patented Sept. 14, 1937

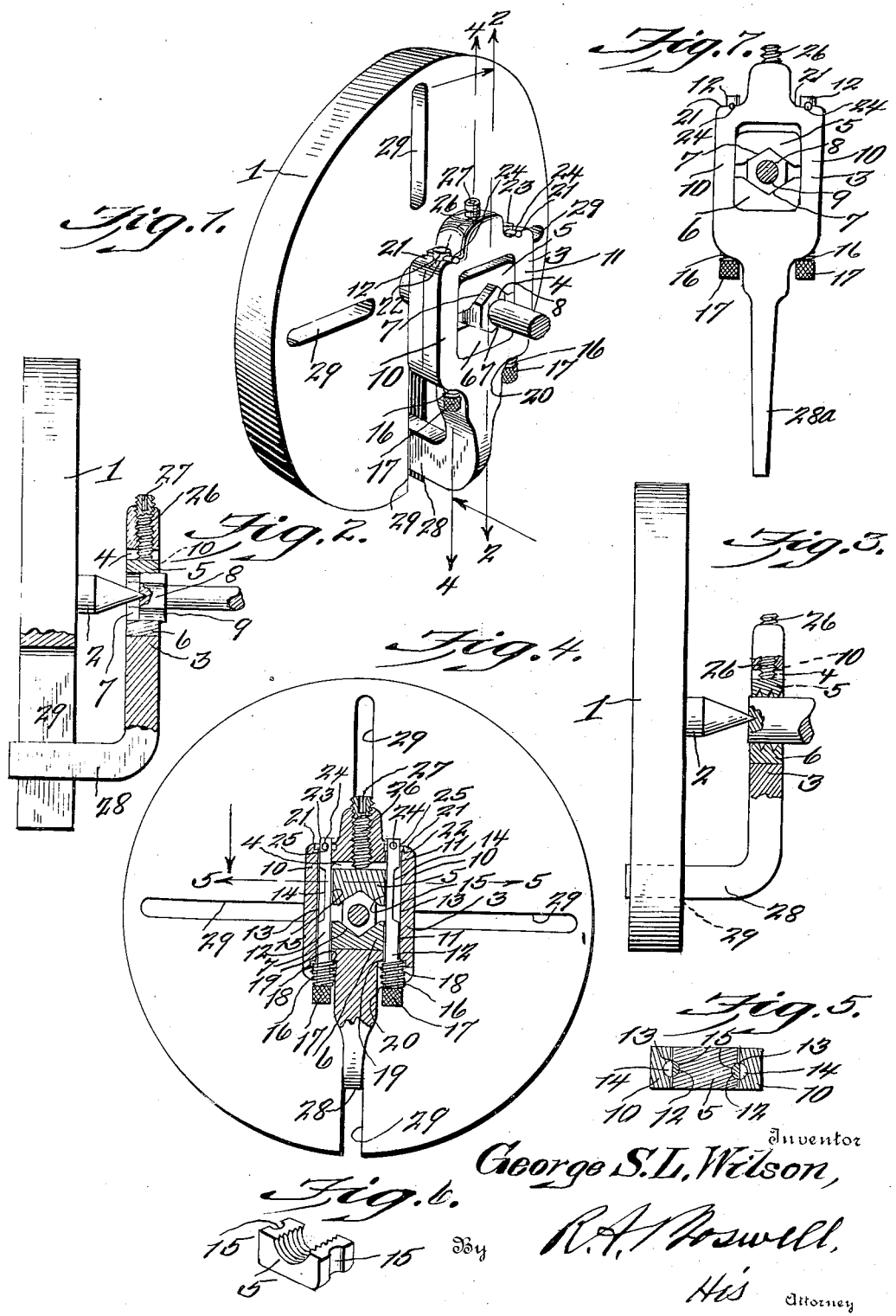

2,092,997

UNITED STATES PATENT OFFICE 2,092,997

LATHE DOG

George S. L. Wilson, Eastport, Md.

Application July 28, 1936, Serial No. 93,101

3 Claims. (Cl. 82—41)

This invention relates to an improved lathe dog, and it is the purpose to provide a device of this kind particularly for safety, as well as accuracy, and also versatile in its use.

This lathe dog, though there is only illustrated two or three different forms of jaws, may have any number of jaws, which support and carry the work to rotate with the power wheel of the lathe, so that threads may be cut on the work, or the work turned down or shoulders may be turned or faced.

Another purpose is to provide a lathe dog provided with means such as spring-tensioned pins for holding the jaws in position in such wise that they may be easily and very quickly removed, for enabling various jaws to be used.

Still another purpose is to provide a lathe dog having means for tightening the jaws in an opening of the dog and on the work to be supported. As in all lathe dogs the body of the dog is provided with a right-angle arm for engagement in one of the plurality of slots of the power wheel or disc of the lathe.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a perspective view of the power wheel or disc of a conventional type of lathe, showing the lathe dog as applied.

Figure 2 is a sectional view on line 2—2 of Fig. 1.

Figure 3 is a view similar to Figure 1 showing a modified construction of clamping jaws for the dog, said modified construction of jaws having flats on the threads of the jaws.

Figure 4 is a sectional view on line 4—4 of Fig. 1.

Figure 5 is a sectional view on line 5—5 of Fig. 4.

Figure 6 is a detail perspective of a modified construction of clamping jaw in which the threads of the jaw are of the ordinary type.

Figure 7 is a view in elevation of a modified form of dog which has a straight arm or tail piece 28a.

Referring to the drawing: 1 is a power wheel or disc mounted on a spindle, 2, of the lathe, the general construction of which is omitted, and 3 identifies the body of the lathe dog having an opening 4 for the reception of the upper and lower jaws 5 and 6, the clamping surfaces of which may be any suitable design or shape, either hexagon, or any other polygonal contour, for the purpose of clamping work itself to move with the power wheel. In Figure 1 the work is shown as provided with a hexagon head 8, which is clamped between the angular surfaces 7 of the jaws 5 and 6. This arrangement enables the face or shoulder 9 of the hexagon head to be faced or turned down as the case may be.

The opposite sides of the dog, as identified at 10 are provided with bores 11 for the reception of the pins or bolts 12. These bores are really formed in the upper and lower portions of the body of the dog. Nevertheless, the bores are cut away at points between those portions of the bores as identified at 11, and these cut away portions 13 are semi-circular in cross section, as more clearly shown in Figure 5. The pins or bolts 12 at points between their ends have elongated cut away portions 14, which are equal in width to the cut away portions 13 of the bores. The jaws 5 and 6 as shown in Figure 6 have their ends provided with semi-circular guides 15, which receive and engage with the pins or bolts 12. It is obvious when the pins or bolts are given a half turn, the cut away portions 14 may register with the elongated cut away portions 13 of the sides of the body of the dog, in which event the jaws may be easily removed from the opening 4 of the dog, allowing the jaws to be changed for the reception of other jaws.

The pins or bolts 12 are tensioned by springs 16, which are interposed between the heads 17 of the pins or bolts and cavities 18 constructed in the bottom 19 between the two walls 20 of the body of the dog. These walls 20 are on opposite sides of the heads (which are knurled as shown) for guarding the heads of the bolts or pins, to insure safety.

The opposite surfaces 21 of one end of the body of the dog has cavities 22, adjoining which the ends 23 of the pins or bolts are arranged. Passing transversely through the ends 23 of the pins or bolts are dowel pins 24, which engage with semi-circular recesses 25 formed in the end surfaces 21. These dowel pins only permit the pins or bolts 12 to rotate one half distance, for the purpose of arranging the cut away portions 14 into and out of register with the cut away portions 13 of the sides of the body of the dog.

A set screw 26 is threaded through one end of the body of the dog and is designed to bear against a surface of the jaw 5, for the purpose of clamping the jaw 5 in position as well as tightening the jaw 6 against one end of the opening 4, in this way the work to be operated on may be clamped between the two jaws. The set screw has a hexagon shaped cavity 27 to receive a similar shaped wrench (not shown), whereby the set screw may be tightened in place.

In order that the dog may operate with the power wheel or disc 1 as well as with the spindle 2, an arm 28 engages in one of the radial slots 29 of the power wheel or disc. Instead of using a right angle arm for engaging the slots of the power wheel, it is possible as in Figure 7 to employ a straight depending tail piece or arm 28a, for cooperation in any convenient manner with the power wheel, so that the dog may rotate with the wheel.

The invention having been set forth, what is claimed is:

1. A lathe dog for a power wheel on a lathe spindle, said dog comprising a body having an opening and provided with parallel guides in the opposed sides of the opening in the body, pins or bolts mounted in said guides and being rotatable for half turns, said guides being semi-cylindrical for a substantial portion of their lengths, opposing jaws in said opening and provided with opposing faces for gripping against a piece of work, said jaws having guiding means adjoining their sides for engagement with said pins or bolts for guiding the jaws, said pins or bolts having cut away portions of substantial length to register into and out of registration with the semi-cylindrical portions of the first guides for permitting the jaws to be removed and replaced, means for clamping the jaws against the work, opposite sides of one end face of the body having a plurality of sets of semi-circular recesses angularly arranged with respect to each other and radial with respect to the pins or bolts, dowels extending transversely of certain ends of the pins or bolts and adapted to seat in said recesses for holding the cut away portions of the pins or bolts out of register with the guides of said jaws, and coil spring members cooperating with the ends of the pins or bolts opposite said dowels for holding the latter in and out of said recesses.

2. A lathe dog for a power wheel on a lathe spindle, said dog comprising a body having an opening, opposing jaws in said opening and shaped to grip a work piece, opposite longitudinal side walls of the opening and the remote side edges of said jaws having guides formed therein, the guides of the longitudinal side walls extending through the upper and lower end of the body, opposite parallel pins or bolts mounted in said guides for individual longitudinal and rotatable movement, said pins or bolts having cut away portions positioned for a substantial part of the lengths of the pins or bolts, said cut away portions being greater in length than the corresponding dimensions of said jaws, whereby when the pins or bolts are rotated to face the cut away portions toward and in register with the jaws the removal of the jaws is possible, means for clamping the jaws against the work, opposite sides of one face of the body having a plurality of pairs of semi-circular recesses angularly arranged with respect to each other and radially with regard to the pins or bolts, dowels transversely of the pins or bolts, and adapted to seat in said recesses, said recesses and dowels determining various angular positions of the parallel pins or bolts, and coil spring members cooperating with the ends of the pins or bolts opposite said dowels for holding the latter in and out of said recesses to retain pins or bolts in their different positions.

3. A lathe dog comprising a body having a parallel sided opening, a cross sectional circular pin mounted in the body at parallel sides of the opening, the pins being mounted for both axial and rotary movement, a pair of jaws mounted in the opening of the body, their opposite edges slidably engaging the parallel sides thereof, the pins invading the opening and engaging cross sectionally circular grooves in the jaws, springs impelling the pins axially in one direction, and a plurality of locking means on said pins, said means being angularly spaced about said pin, means on said body to cooperate with said locking means for interlocking the pins with the body in either of two positions, said locking means being released when the pins are moved in opposition to the springs so that the pins may then be rotated, the pins being formed with lateral recesses at corresponding points and of a length at least the length of one jaw and of a depth to have their bottoms spaced the width of a jaw in one of the interlocked positions of the pins.

GEORGE S. L. WILSON.